G. LUNDHOLM.
DRIVING MEANS FOR ELECTRIC LOCOMOTIVES.
APPLICATION FILED JAN. 30, 1914.
1,097,810.
Patented May 26, 1914.
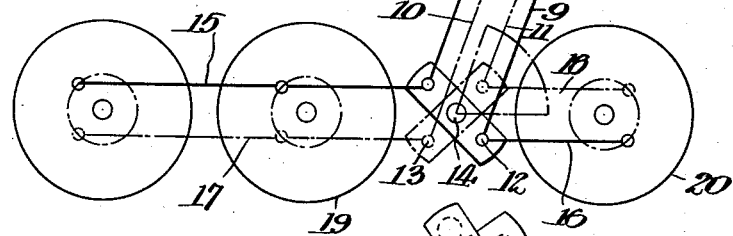
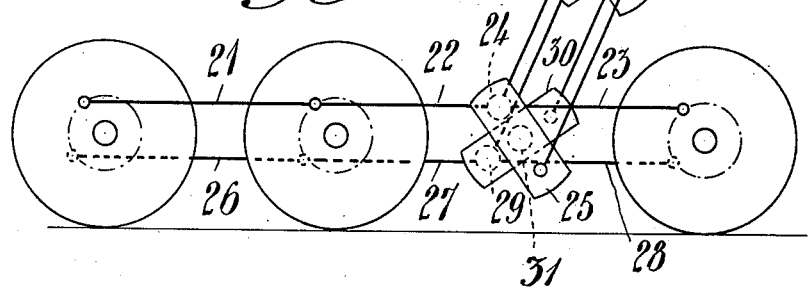
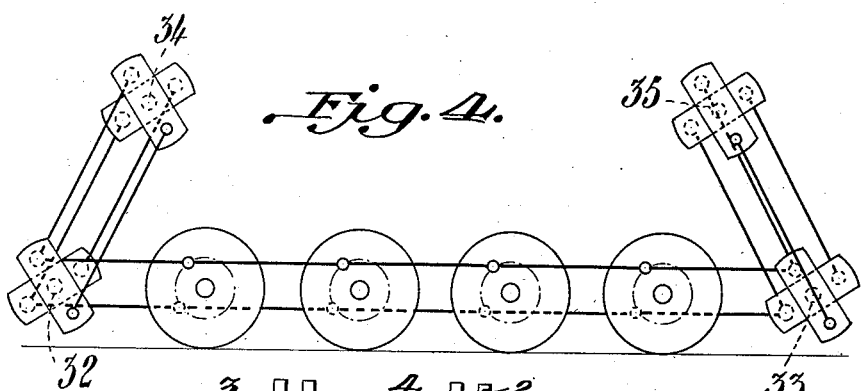
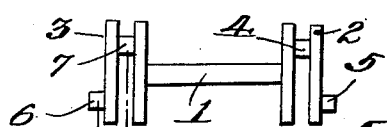
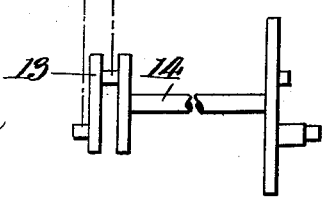

UNITED STATES PATENT OFFICE.

GUSTAF LUNDHOLM, OF VESTERÅS, SWEDEN.

DRIVING MEANS FOR ELECTRIC LOCOMOTIVES.

1,097,810.  Specification of Letters Patent.  Patented May 26, 1914.

Application filed January 30, 1914. Serial No. 815,479.

*To all whom it may concern:*

Be it known that I, GUSTAF LUNDHOLM, a citizen of the United States, residing at Vesterås, Sweden, have invented new and useful Improvements in Driving Means for Electric Locomotives, of which the following is a specification.

This invention relates to driving means for electric locomotives, and its object is to provide a device for transmitting the movements of the driving shaft to the driving wheels of the locomotive in such manner that the stresses exerted upon shafts and bearings become as small as possible, so that the bearings as well as the device in its totality can be made lighter and simpler and, on account thereof, cheaper than has heretofore been possible.

The invention consists, chiefly, in this that the transmitting of the movements of the driving shaft to the driving wheels is effected by means of double cranks attached to the driving shaft and provided with crank pins placed diametrically opposite to one another relatively to the driving shaft, the said crank pins being, by means of connecting rods, connected with corresponding double cranks attached to a blind shaft which is journaled on a level with the driving wheels, the last named cranks transmitting the movements to the driving wheels by means of coupling rods.

The invention is illustrated diagrammatically in the accompanying drawing in which—

Figure 1 shows a form of the device in side view and Fig. 2 the same in end view. Figs. 3 and 4 show modified forms of the invention.

Referring to Figs. 1 and 2, 1 designates the driving shaft being, preferably, the shaft of the motor. Attached to each end of said shaft is a double crank 2 and 3 respectively, each of said double cranks being provided with crank pins, 4, 5 and 6, 7 respectively, placed opposite to one another relatively to the shaft 1. Said crank pins are, by means of connecting rods 8, 9, 10, 11, connected with crank pins of corresponding double cranks 12, 13 attached to a blind shaft 14 which is journaled between the driving wheels of the locomotive. The cranks 2, 3 and, consequently, also the cranks 12, 13 are placed at right angles to one another.

Each of the crank pins of the crank 12 is by means of a coupling rod 15 and 16 respectively connected with a separate driving wheel 19 and 20 respectively placed at the respective side of the locomotive immediately in front of, respectively behind the blind shaft 14. In the same manner the crank pins of the crank 13 are, by means of coupling rods 17, 18, connected with two other driving wheels attached to the same shafts as the wheels 19, 20. By means of said arrangement of the crank and the crank pins, the crank pins pertaining to the same pair of wheels will, as usual, be placed at 90° relatively to one another.

When carrying out the driving device above described, the connecting rods and the coupling rods pertaining to the same cranks are to be placed in different planes, so as not to collide with one another, when the device is running. Such an arrangement of the cranks and the crank pins is illustrated in Fig. 2 from the right part of which also appears the positions of the coupling rod pins on the wheels 19, 20. Further, it is necessary, in order to attain always the proper distribution of work in all the connecting rods, so that the tractive force in a coupling rod always will be equal to the compressive force in the other coupling rod pertaining to the same crank, to arrange the bearings of the blind shaft in such manner that they will be free to move to a certain extent in vertical direction. On account thereof, the blind shaft will assume, by itself, the position effecting the proper distribution of work. In horizontal direction, on the contrary, the bearings should be stationary.

By means of the arrangement above described considerable advantages are attained over against driving devices hitherto known. Because the forces working in the connecting rods pertaining to the same pair of cranks, as for instance the connecting rods 8 and 9, are equal and directed oppositely, the resulting bearing pressures originating from the working of the connecting rods and also the bending stresses in the shafts will be very small, since they depend only on the moment resulting from the connecting rods belonging together not being located in the same plane. Consequently, considerably simpler constructions of bearings than those used in driving devices heretofore known may be employed, and, besides, the wear and tear, as well as the danger of running hot will be considerably reduced. Likewise, the shafts as well as the frame-work may be constructed lighter, because it is not necessary to take into consideration the considerable stresses caused by the connecting rods in locomotives provided with a single connecting rod at each of the motor shafts.

In heretofore known constructions it has proved preferable so to place the motor that the connecting line between the center of the motor shaft and that of the blind shaft does not form too great an angle with the horizontal plane. Generally, this angle has been made 45°. In devices according to the present invention this will not be necessary. One is free to choose the positions of the motor and the blind shaft relatively to one another at will and may, for instance, place the motor vertically above the blind shaft which is a very suitable arrangement.

In case of an equal number of driving shafts at each side of the blind shaft, the forces working in the coupling rods pertaining to the same crank are equal (provided the frictions between the wheels and the rails are equal at both pairs of driving wheels). In using different numbers of driving shafts, however, at each side of the blind shaft, the difference (causing horizontal pressures in the blind shaft bearings) need not be greater than corresponding to the driving force exerted on one shaft.

The slight increase in weight caused by using double cranks is of no essential significance, since the weight of the additional connecting rod even compensates for the balance weight which else is to be arranged as a part of the crank. The increase in space necessary for the double device may, to a large extent, be compensated for by reducing the size of the motor bearings, and, besides, the crank pins may be made shorter than usual since they have to receive only half as great stresses as before.

In the modified forms of the invention shown in Figs. 3 and 4 all of the coupling rods at each side of the locomotive are located in one vertical plane and connected with the inner crank pin of the corresponding double crank of the blind shaft. Thus, for instance, the coupling rods 21, 22, 23 in Fig. 3 located at the one side of the locomotive are placed in the same vertical plane and connected with the inner crank pin 24 of the crank 25, while the coupling rods 26, 27, 28, located at the other side of the locomotive are, likewise, placed in one vertical plane and connected with the inner crank pin 29 of the crank 30. As is shown in Fig. 3, the blind shaft 31 is arranged between the driving wheels in the same manner as in Fig. 1. The form shown in Fig. 4 corresponds to that shown in Fig. 3 with the exception that two blind shafts 32, 33 and two driving shafts 34, 35 are provided, both blind shafts being so located that all of the driving wheels are placed at the one side of each blind shaft. In the forms shown in Figs. 3 and 4 the pressure exerted in the blind shaft bearing or bearings is directed horizontally, just as in Fig. 1 and equal to the total driving force. An essential advantage is, however, attained by means of the first-named forms consisting in this that the whole arrangement causes, owing to the possibility of using shorter bearings of the motor shaft, that the plane of the coupling rods of the driving wheels may be placed nearer to the bearings of said wheels than has heretofore been possible, since the coupling rods may be so located that they clear exactly the rims of the wheels. Thereby it is attained that the stresses exerted in the shafts of the driving wheels as well as in their bearings and in the frame-work will be reduced, and, consequently, that the construction of said parts will be lighter.

Having now described my invention, what I claim as new and desire to secure by Letters Patent is:

1. In driving means for electric locomotives, the combination of a motor, driving wheels, a driving shaft, double cranks attached to the driving shaft, crank pins placed on said double cranks diametrically opposite to one another relatively to the driving shaft, a blind shaft located on a level with the driving wheels, double cranks attached to said blind shaft and connected with the afore-said double cranks, and coupling rods connecting the cranks of the blind shaft with the driving wheels, substantially as and for the purpose set forth.

2. In driving means for electric locomotives the combination of a motor, driving wheels, a driving shaft, double cranks attached to the driving shaft and placed so as to form 90° with one another, crank pins placed on said double cranks diametrically opposite to one another relatively to the driving shaft, a blind shaft located on a level with the driving wheels, double cranks attached to said blind shaft and connected with the afore-said double cranks, and coupling rods connecting the cranks of the blind shaft with the driving wheels, substantially as and for the purpose set forth.

3. In driving means for electric locomotives, the combination of a motor, driving wheels, a driving shaft, double cranks attached to the driving shaft, crank pins placed on said double cranks diametrically opposite to one another relatively to the driving shaft, a blind shaft located between the driving wheels, double cranks attached to said blind shaft and connected with the afore-said double cranks, and coupling rods connecting the cranks of the blind shaft with the driving wheels, substantially as and for the purpose set forth.

In testimony whereof I have hereunto set my hand in presence of two subscribing witnesses.

GUSTAF LUNDHOLM.

Witnesses:
A. K. AUBECK,
A. NILSSON.

Copies of this patent may be obtained for five cents each, by addressing the "Commissioner of Patents, Washington, D. C."